United States Patent [19]

Kalamon et al.

[11] Patent Number: 4,893,582
[45] Date of Patent: Jan. 16, 1990

[54] DECK BOX VALVE OPERATOR AND POSITION INDICATOR ASSEMBLY

[75] Inventors: Bruce P. Kalamon; David P. Yanusko, both of Pottstown, Pa.

[73] Assignee: Teleflex Incorporated, Limerick, Pa.

[21] Appl. No.: 932,693

[22] Filed: Nov. 19, 1986

[51] Int. Cl.⁴ .............................................. F16K 37/00
[52] U.S. Cl. .................... 116/277; 116/284; 137/553; 74/436; 70/180
[58] Field of Search ............... 116/230, 233, 277, 284, 116/DIG. 21; 74/436, 530; 137/556, 553; 70/158–160, 175–180, 200, 202, 203, 212

[56] References Cited

U.S. PATENT DOCUMENTS

| | | | |
|---|---|---|---|
| 206,228 | 7/1878 | Connolly | 70/180 |
| 1,125,675 | 1/1915 | Elder et al. | 70/177 |
| 1,328,109 | 1/1920 | Whitlock | 70/159 |
| 2,414,221 | 1/1947 | Bristol | 74/436 |
| 2,959,149 | 11/1960 | Schwenk | 116/277 |
| 3,505,972 | 4/1970 | Benjamin | 116/277 |
| 3,656,504 | 4/1972 | Topinka | 137/553 |
| 3,855,873 | 12/1974 | Fletcher et al. | 74/436 |
| 4,509,387 | 4/1985 | Tschanz et al. | 74/505 |
| 4,655,160 | 4/1987 | Ligh | 116/277 |

Primary Examiner—William A. Cuchlinski, Jr.
Assistant Examiner—W. Morris Worth
Attorney, Agent, or Firm—Reising, Ethington Barnard, Perry & Milton

[57] ABSTRACT

A deck box valve operator and position indicator assembly characterized by a sprocket (66) supported by the housing (18) on a plateau (70) adjacent the spindle means (46) and having a plurality of radial forked (74) arms (72) with arcuate peripheries (76) extending between adjacent arms to extend about the circular circumference (78) of the spindle means (46). The spindle means (46) has a concaved recess (80) interrupting its circular circumference in an annular groove extending above the spindle means (46) for receiving the arms (72) of the sprocket (66). A gear train interconnects the sprocket (46) and an indicator ring (62) rotatably disposed in the housing for establishing a ratio between the number of revolutions of the spindle means (46) and the ring indicator (62) means whereby the ring (62) indicates the position of a valve means (12) between open and shut. A co-axial pin (84) which is supported by the spindle means (46) radially outside of its circular circumference (78) and in the center of the concave recess (80), slides into the slot (74) of one of the arms (72) to rotate the arm through the concave recess (80) so that the next adjacent arcuate periphery (76) compliments the approaching the circular circumference (78) of the spindle means (46) as the pin (84) slides radially out of engagement with the arm.

11 Claims, 4 Drawing Sheets

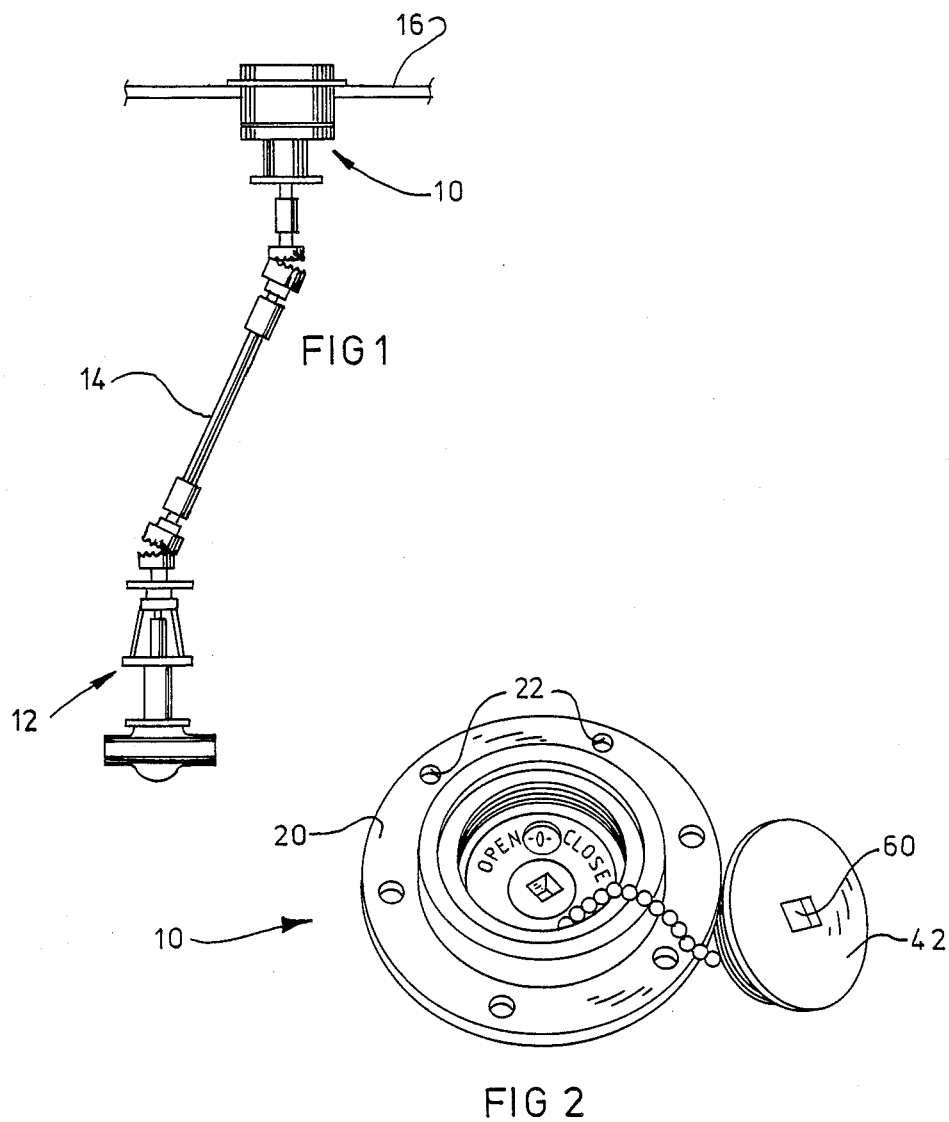

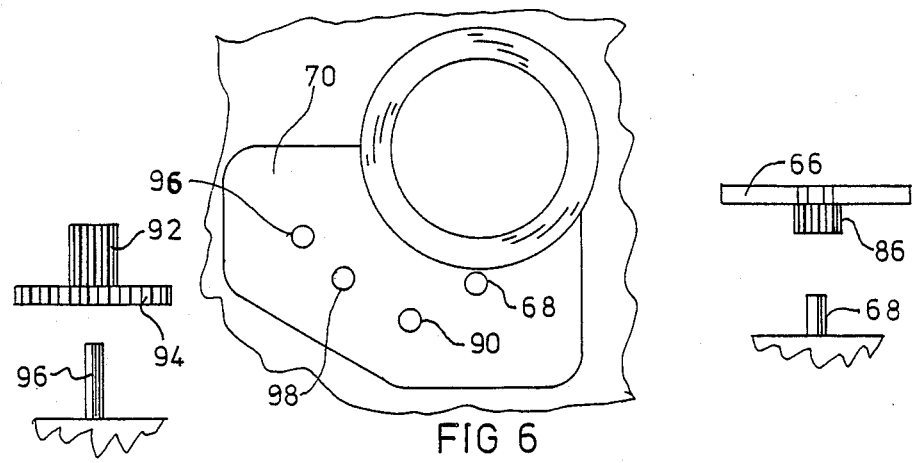
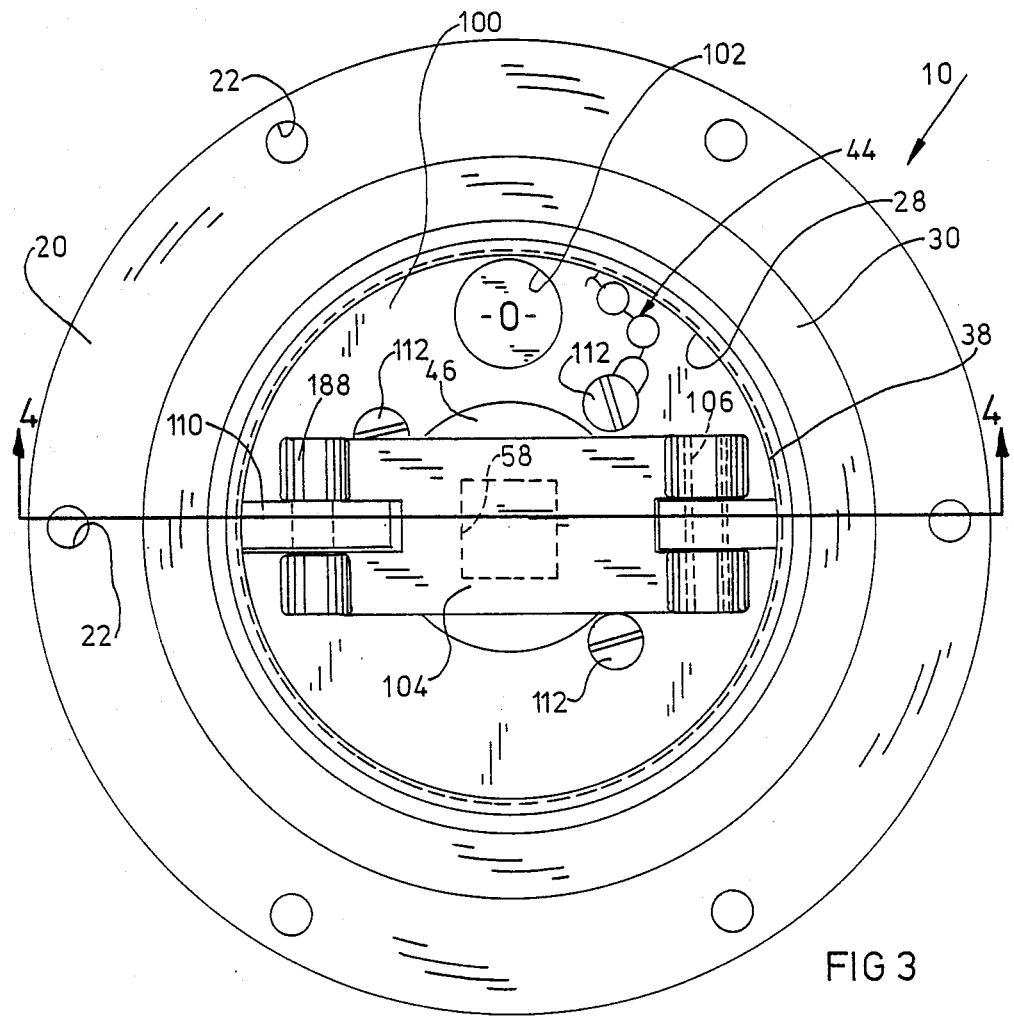

DECK BOX VALVE OPERATOR AND POSITION INDICATOR ASSEMBLY

TECHNICAL FIELD

The subject invention relates to a deck box valve operator and position indicator assembly of the type for being mounted in the deck of a ship and connected to a rotary shaft which extends to a remotely positioned valve for rotating the valve between shut and open positions and indicating the degree of opening of the valve. Typically the indicator would indicate the number of revolutions from a shut or open position or alternatively would indicate the number of degrees of opening between zero and three hundred and sixty degrees.

BACKGROUND ART

The deck box valve operator and position indicator assemblies known in the prior art generally include a housing for mounting in the deck of a ship, or the like, with spindle means rotatably supported by the housing for connection at the lower end to a shaft extending to a remotely disposed valve and having an upper end for receiving a tool to rotate the spindle. An indicator ring is rotatably supported in the housing and includes indicia for indicating the rotary position of the valve between open and shut positions. A transmission means operatively interconnects the spindle and the ring for rotating the ring in a ratio or proportion to the rotation of the spindle. An example of such an assembly is that shown in U.S. Pat. No. 3,505,972 granted Apr. 14, 1972 to P. M. Benjamin.

There is a need for such an assembly wherein the number of components is reduced and the components are simplified for manufacturing process and wherein the transmission means between the spindle and the indicator ring is easily varied to change the ratios between the number of rotations of the spindle to the number of rotations of the indictor ring.

SUMMARY OF THE INVENTION AND ADVANTAGES

A deck box valve operator and position indicator assembly comprising housing means for mounting to a support structure with spindle means rotatably supported in the housing means. The spindle means has a lower end for connection to the operating shaft of a value and an upper end for receiving a tool for rotating the spindle means. A ring means is rotatably supported in the housing means for indicating the position of the valve between open and shut positions. A transmission means operatively interconnects the spindle means and the ring means for rotating the ring means in proportion to the rotation of the spindle means. The transmission means is characterized by a sprocket supported by the housing about a sprocket axis adjacent the spindle means and including a plurality of radial arms having slots extending thereinto from the distal ends thereof with arcuate peripheries extending between adjacent arms. The spindle means has a circular circumference interrupted by a concave recess axially aligned with the sprocket with the arcuate peripheries between the arms of the sprocket being complimentary to the circular circumference of the spindle means. The concave recess is concentric to the axis of the sprocket when radially aligned therewith so that the arms of the sprocket extend into the concave recess when radially aligned therewith. A coaxial pin is supported by the spindle means radially outside of the circular circumference thereof and on the radial center of the concave recess so that the sprocket is prevented from rotating by an arcuate periphery being complimentary the circular circumference of the spindle means as the adjacent arms extend about the circular circumference until the spindle means is rotated sufficiently to slide the pin into the slot of one of the arms to rotate the sprocket as the pin-engaged arm rotates through the concave recess where the next adjacent arcuate periphery compliments the approaching circular circumference of the spindle means and the pin slides radially out of engagement with the pin-engaged arm.

The deck box valve operator and position indicator assembly of the subject invention provides an easily manufactured and fabricated assembly of a minimum number of components and compactly arranged with a versatility of ratios of rotation between the spindle means and the indicator ring means and with the sprocket rotated by the spindle means being in positive engagement therewith whereby it is positively moved in response to rotation of the spindle means and is positively prevented from rotation by engagement with the spindle means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view illustrating the environment in which the subject invention is utilized;

FIG. 2 is a top perspective view of the subject invention;

FIG. 3 is a top view of the subject invention;

FIG. 6 is a schematic view illustrating the gear train combination shown in FIG. 5.

DESCRIPTION OF THE PREFERRED EMBODIMENT

Figure 7:
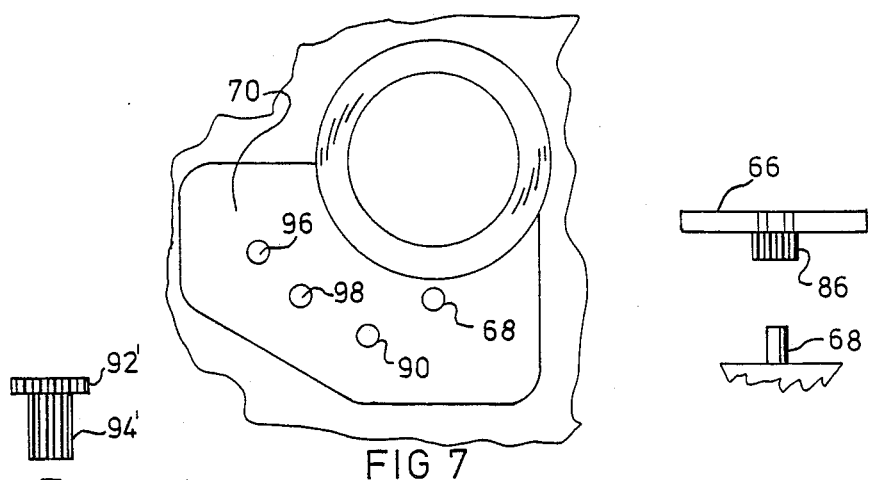
FIG. 7 is a schematic view similar to FIG. 6 showing an alternative gear train.
Figure 4:
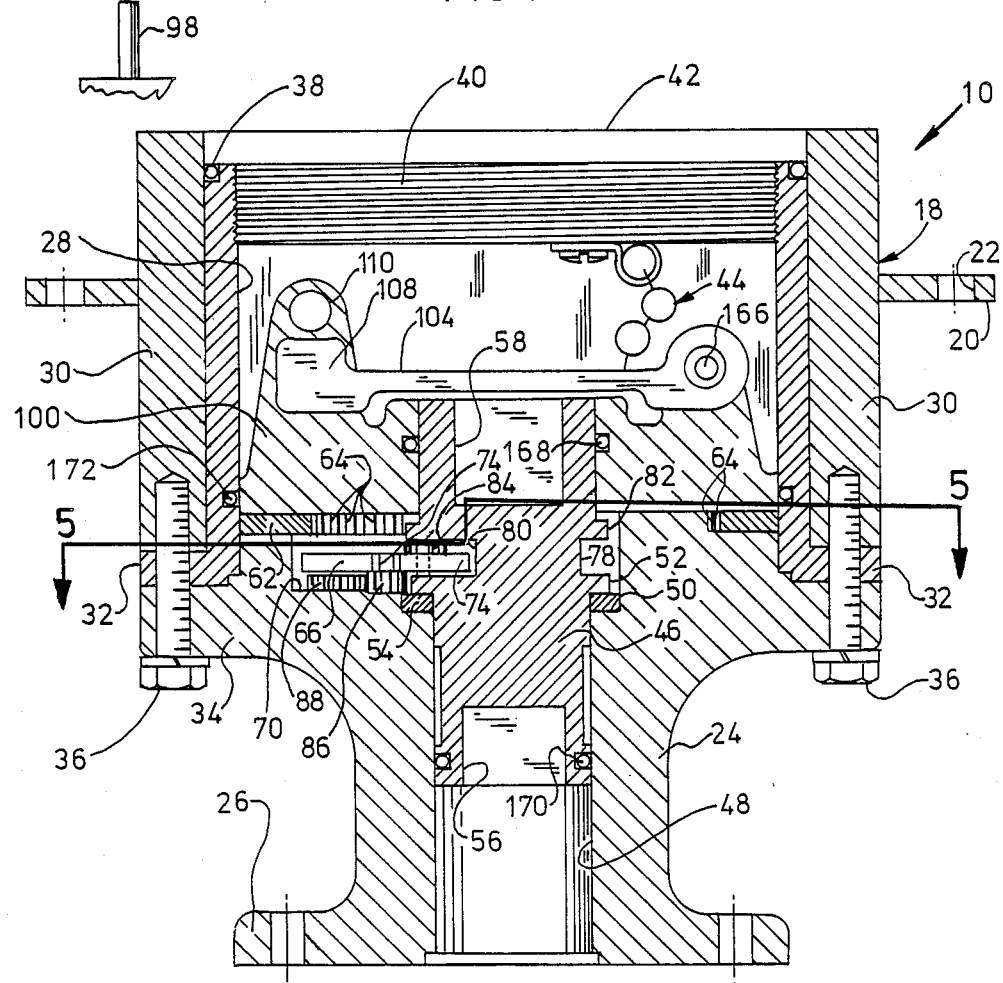
FIG. 4 is a cross-sectional view taken substantially along line 4—4 of FIG. 3 but including the closure cap.

A deck box valve operator and position indicator assembly constructed in accordance with the instant invention is generally shown at 10. The deck box assembly 10 rotates a remotely mounted valve assembly, generally shown at 12, through a shaft assembly 14. The deck box assembly 10 is mounted to a deck 16 or a similar support structure. Although the assembly 10 is illustrated as being used with a rigid shaft assembly 14, it may be used with a flexible shaft or, in its most preferred use, with the cable system shown in U.S. Pat. No. 4,509,387 granted to A. E. Tschanz et al on Apr. 9, 1985 and assigned to the assignee of the subject invention.

The deck box assembly 10 includes a housing means generally indicated at 18 including a radially extending flange 20 having a plurality of holes 22 therein for mounting to a support structure, such as the deck 16 of a ship.

The housing means 18 includes a main housing portion 24 having a lower flange 26 with bolt holes therethrough for mounting to a support structure whereby one or both of the flanges 20 and 26 may be utilized for mounting the assembly 10 to a support structure. The upper portion of the housing means 18 includes a flanged inner sleeve 28 and an outer welded sleeve 30. The inner sleeve 28 has an annular radially outwardly extending flange 32 at the bottom thereof resting upon an annular flange 34 of the main housing portion 24. A plurality of hex bolts 36 extend upwardly through the flange 34 of the main housing portion 24 and through holes in the flange 32 of the inner sleeve 28 and into threaded engagement with threaded bores in the bottom of the welded sleeve 30. The upper end of the inner sleeve 28 includes an O-ring and groove 38 adjacent the outer welded sleeve 30. The interior of the inner sleeve 28 at the top thereof is threaded with the threads 40 for threadably receiving a cap 42. The cap 42 includes a flange for engaging the O-ring 38 and is prevented from being separated from the housing means 18 by a chain means generally indicated at 44.

A spindle means comprising an integral one piece spindle 46 is rotatably supported in a bore 48 of the main housing portion 24. The housing portion 24 presents an annular shoulder axially below an annular flange 52 of the spindle means 46 with bearing means 54 disposed between the shoulder 50 and the flange 52 for rotatably supporting the spindle means 46 in the housing means 18. The spindle means 46 has a lower end including a female socket 56 for connection to the operating shaft assembly 14 of a valve assembly 12. In addition, the spindle means 46 has an upper end with a female socket 58 for receiving a tool for rotating the spindle means 46. The female socket 58 is generally square in configuration and a similar socket 60 of the same configuration is disposed in the cap 42 whereby the same tool may be utilized to rotate the cap 42 and to rotate the spindle 46.

A ring means comprising a flat indicator ring 62 is rotatably supported on the upper surface of the main housing portion 24 for indicating the position of the valve 12 between open and shut positions. The sleeves 28 and 30 define an upper cylindrical portion of the housing means 18 surrounding the ring means 62 and extending upwardly from the ring means 62 to the threaded cap receiving threads 40. The inner diameter of the indicator ring 62 includes the gear teeth 64 for rotating the ring 62.

A transmission means operatively interconnects the spindle 46 and the teeth 64 of the indicator ring 62 for rotating the ring 62 in proportion to the rotation of the spindle 46. More specifically, the transmission means is characterized by a sprocket 66 supported on a shaft 68 by the housing portion 24 for rotation about a sprocket axis which is adjacent the spindle 46. The housing portion 24 presents a platform or plateau 70 adjacent the spindle 46 for supporting the transmission means including the sprocket 66. The sprocket 66 includes a plurality of four radial arms 72 each having a slot 74 extending thereinto from the distal ends thereof. The sprocket 66 includes arcuate circular peripheries 76 extending between its adjacent arms 72. The spindle 46 has a circular circumference 78 interrupted by a concave circular recess 80 axially aligned with the sprocket 66. The circular circumference 78 and the concave recess 80 are disposed in a groove extending about the circumference of the spindle 46 with the groove being defined by spaced radial surfaces between or defined by the annular flange 52 on the lower side and an upper flange 82 on the upper side.

Figure 5:
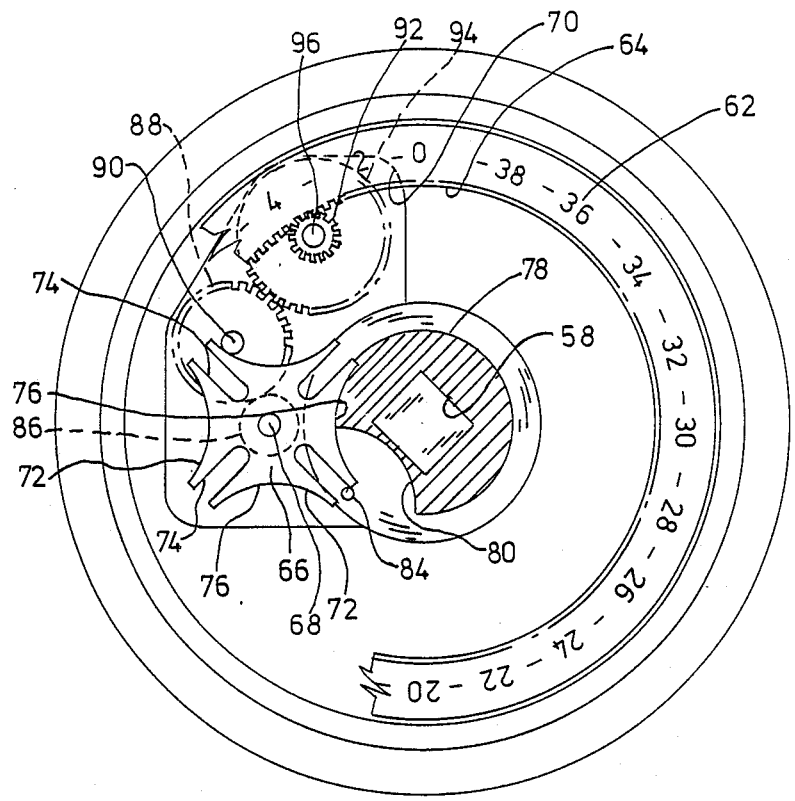
FIG. 5 is a cross-sectional view taken substantially along line 5—5 of FIG. 4.

The circular arcuate peripheries 76 between the arms 72 of the sprocket 66 are complimentary in shape or have the same radius as the circular circumference 78 of the sprocket 46. The concaved recess 80 is concentric to the axis of rotation of the sprocket 66 when radially aligned therewith. The arms 72 of the sprocket 66 extend into the concave recess 80 when radially aligned therewith. A coaxial pin 84 is supported between the flanges 52 and 82 or opposed surfaces of the groove at a position radially outside of the circular circumference 78 and on the radial center line of the concaved recess 80 so that the sprocket 66 is prevented from rotating by an arcuate periphery 76 complementing the circular circumference 78 of the spindle 46, as shown in FIG. 5, until the spindle 46 is rotated sufficiently to slide the pin 84 into a slot 74 of one of the arms 72 to rotate the sprocket 66 as the pin-engaged arm 72 rotates through the concave recess 80 where the next adjacent arcuate periphery 76 compliments the approaching circular circumference 78 of the spindle 46 and the pin 84 slides radially out of engagement with the pin-engaged arm 72. In other words, the pin 84 is disposed between the radial surfaces of the groove defining the circumference 78 and recess 80 at a position outside the circle defining the circular circumference 78 so that it may engage a slot 76 disposed immediately adjacent the circular surface 78 of the spindle 46.

The transmission means also includes a plurality of gears operatively driving the indicator ring 62 from the sprocket 66. The plurality of gears includes a first gear 86 co-axially aligned with and driven and with the sprocket 66. The first gear 86 is disposed immediately underneath the sprocket 66 on the platform 70. An idler gear 88 is in meshing engagement with the first gear 86 and is supported upon an idler gear support shaft 90 extending upwardly from the platform 70. A drive gear 92 is in meshing engagement with the teeth 64 of the indicator ring 62 and a second gear 94 is co-axially aligned with and rotates with and drives the drive gear 92 as the second gear 94 is in meshing engagement with the idler gear 88. The drive gear 92 and second gear 94 may be integral and are rotatably supported upon a drive gear shaft 96.

An alterative gear train may be utilized as the platform 70 presents two support positions, one as described above with the drive shaft 96 as shown in FIG. 6, or the other being the support shaft 98 as shown in FIG. 7 for supporting an alternative drive gear 92' and second gear 94' of a different diameter whereby a different ratio may be established between the number of revolutions of the spindle 46 to the number of revolutions of the indicator ring 62.

The assembly includes a cover 100 supported within the sleeve 28 of the housing means and disposed over the indicator ring 62. The cover 100 includes a circular opening 102 for reading indicia on the upper surface of the indicator ring 62 for visually determining the angular position of the valve 12 between shut and open positions.

A locking bar means or member 104 is pivotally supported by the cover 100 through a pin 106 for movement between a locked position preventing access to the upper female socket 58 of the spindle 46 and a vertically extending unlocked position for allowing access to the socket 58 of the spindle 46. The locking bar 104 is pivotally supported by the cover 100 at one end by the pin 106 to extend over the upper socket 58 end of the spindle 46 in the locked position to a distal end 108. The distal end 108 includes a pair of spaced lugs or ears having a slot or groove therebetween for receiving a tongue 110 of the cover 100. The tongue 110 has a hole therethrough for receiving a pad lock, or the like, to prevent upward pivotal movement of the locking bar 104 from the locked position.

Various screws 112 secure the cover 100 to the housing part 24.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A deck box valve operator and position indicator assembly (10) comprising; housing means (18) for mounting to a support structure (16), spindle means (46) rotatably supported in said housing means (18) said housing means including means for reading said ring means (62), said spindle means (46) having a lower end (56) for connection to the operating shaft (14) of a valve (12), said spindle means (46) having an upper end (58) for receiving a tool for rotating said spindle means (46), ring means (62) rotatably supported in said housing means (18) for indicating the position of the valve (12) between open and shut positions, and transmission means operatively interconnecting said spindle means (46) and said ring means (62) for rotating said ring means in proportion to the rotation of said spindle means (46), said transmission means being characterized by a sprocket (66) supported by said housing means (18) for rotation about a sprocket axis (68) adjacent said spindle means (46), said sprocket (66) having a plurality of radial arms (72) having slots (74) extending thereinto from the distal ends thereof, said sprocket (66) having arcuate peripheries (76) extending between adjacent arms (72), said spindle means (46) having a circular circumference (78) interrupted by a concave recess (80) axially aligned with said sprocket (66), said arcuate peripheries (76) between said arms (72) of said sprocket (66) being complementing to said circular circumference (78) of said spindle means (46), said concave recess (80) being concentric to said axis (68) of said sprocket (66) when radially aligned therewith, said arms (72) of said sprocket (66) extending into said concave recess (80) when radially aligned therewith, a coaxial pin (84) supported by said spindle means (46) radially outside of said circular circumference (78) thereof and on the radial center of said concave recess (80) so that said sprocket (66) is prevented from rotating by an arcuate periphery (76) complimentary said circular circumference (78) of said spindle means (46) with the adjacent arms (72) extending about said circular circumference (78) until said spindle means (46) is rotated sufficiently to slide said pin (84) into the slot (74) of one of said arms (72) to rotate said sprocket (66) as the pin-engaged arm (72) rotates through said concave recess (80) where the next adjacent arcuate periphery (76) compliments the approaching circular circumference (78) of said spindle means (46) and said pin (84) slides radially out of engagement with the pin-engaged arm (72).

2. An assembly as set forth in claim 1 further characterized by said circular circumference (78) and said concave recess (80) being disposed in a groove extending about said spindle means (46), said groove having spaced radial surfaces.

3. An assembly as set forth in claim 2 further characterized by said pin (84) extending between said spaced radial surfaces of said groove at a position outside the circle of said circular circumference (78).

4. An assembly as set forth in claim 3 further characterized by said transmission means including a plurality of gears operatively driving said ring means (62) from said sprocket (66).

5. An assembly as set forth in claim 4 further characterized by said plurality of gears including a first gear (86) co-axially driven by said sprocket (66), an idler gear (88) in meshing engagement with said first gear (86), a drive gear (92) in meshing engagement with said ring means (62) and a second gear (94) co-axially driving said drive gear (92) and in meshing engagement with said idler gear (88).

6. An assembly as set forth in claim 5 further characterized by said housing means (18) presenting a platform (70) adjacent said spindle means (46) for supporting said plurality of gears, said platform (70) presenting two support positions (96, 98) for said drive (92, 92,) and second gears (94, 94') so that different sizes of drive and second gears may be used to provide different ratios of rotation between said spindle means (46) and said ring means (62).

7. An assembly as set forth in either one of claims 1 or 5 further characterized by including a cover (100) fixedly supported in said housing means (18) over said ring means (62) and locking bar means (104) operatively supported by said cover (100) for movement between a locked position preventing access to said upper (58) end of said spindle means (46) and an unlocked position for allowing access to said upper end (58) of said spindle means (46).

8. An assembly as set forth in claim 5 further characterized by said spaced radial surfaces defining upper and lower flanges (82,52), said housing means (18) presenting an annular shoulder (50) below said lower flange (52), and bearing means (54) disposed between said lower flange (52) and said shoulder (50) for rotatably supporting said spindle means (46) in said housing means (18).

9. An assembly as set forth in claim 8 further characterized by said housing means (18) defining a cylindrical upper portion surrounding said ring means (62) and extending upwardly to a threaded cap receiving portion (40).

10. A deck box valve operator and position indicator assembly (10) comprising; housing means (18) for mounting to a support structure (16), spindle means (46) rotatably supported in said housing means (18), said spindle means (46) having a lower end (56) for connection to the operating shaft (14) of a valve (12), said spindle means (46) having an upper end (58) for receiving a tool for rotating said spindle means (46), ring means (62) rotatably supported in said housing means (18) said housing means including means for reading said ring means (62) for indicating the position of the valve (12) between open and shut positions, and transmission means operatively interconnecting said spindle means (46) and said ring means (62) for rotating said ring means (62) in proportion to the rotation of said spindle means (46), a cover (100) fixedly supported in said housing means (18) over said ring means (62), and characterized by including locking bar means (104) operatively supported by said cover (100) for movement between a locked position preventing access to said upper end (58) of said spindle means (46) and an unlocked position for allowing access to said upper end (58) of said spindle means (46).

11. An assembly as set forth in claim 10 further characterized by said locking means comprising a locking bar (104) pivotally supported by said cover (100) at one end (106) to extend over said upper end (58) of said spindle means (46) in said locked position to a distal end, said distal end of said locking bar (104) and said cover (100) presenting a locking tongue (110) and groove for receiving a lock to prevent pivotal movement of said bar (104) from said locked position.

* * * * *